(12) United States Patent
Wang et al.

(10) Patent No.: US 12,450,769 B2
(45) Date of Patent: Oct. 21, 2025

(54) OBJECT DETECTION SYSTEM AND OBJECT DETECTION ASSISTANT SYSTEM

(71) Applicant: PEGATRON CORPORATION, Taipei (TW)

(72) Inventors: Wen-Ting Wang, Taipei (TW); Yu-Hung Tseng, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 328 days.

(21) Appl. No.: 18/308,057

(22) Filed: Apr. 27, 2023

(65) Prior Publication Data

US 2024/0013430 A1   Jan. 11, 2024

(30) Foreign Application Priority Data

Jul. 8, 2022   (TW) .................................. 111125826

(51) Int. Cl.
*G06K 9/00* (2022.01)
*G06T 7/11* (2017.01)
(Continued)

(52) U.S. Cl.
CPC .................. *G06T 7/70* (2017.01); *G06T 7/11* (2017.01); *G06T 7/13* (2017.01); *G06T 7/60* (2013.01);
(Continued)

(58) Field of Classification Search
CPC ..... G06T 7/70; G06T 7/11; G06T 7/13; G06T 7/60; G06T 7/00; G06V 10/764;
(Continued)

(56) References Cited

U.S. PATENT DOCUMENTS 10,657,364 B2 * 5/2020 El-Khamy ............ G06V 10/10
10,726,279 B1 * 7/2020 Kim ....................... G06N 3/045
(Continued)

FOREIGN PATENT DOCUMENTS

CN 108229308 A * 6/2018 ............... G06T 7/73
CN 109635727 A 4/2019
(Continued)

OTHER PUBLICATIONS

Mean Opinion Score Estimation for Mobile Broadband Networks Using Bayesian Networks, Ayman A. El-Saleh et al., Tech Science Press, Jan. 2022, pp. 4571-4587 (Year: 2022).*
(Continued)

*Primary Examiner* — Jayesh A Patel
(74) *Attorney, Agent, or Firm* — McClure, Qualey & Rodack, LLP

(57) ABSTRACT

An object detection assistant system includes a memory and a processor. The processor is coupled to the memory. The memory stores one or more commands. The processor accesses and executes one or more commands of the memory. One or more commands include inputting a detection result parameter output by an object detection neural network for object detection of an image to an assistant neural network to output a first correction coefficient after processing by the assistant neural network, where the detection result parameter includes object information and a first confidence; inputting the first correction coefficient and detection result parameters to a Bayesian classifier to output a second correction coefficient; and adjusting the first confidence according to the second correction coefficient to obtain second confidence, and the second confidence being taken as the first confidence of the adjusted detection result parameter.

10 Claims, 4 Drawing Sheets

(51) Int. Cl.
  *G06T 7/13*    (2017.01)
  *G06T 7/60*    (2017.01)
  *G06T 7/70*    (2017.01)
  *G06V 10/764*  (2022.01)
  *G06V 10/82*   (2022.01)

(52) U.S. Cl.
  CPC ............ *G06V 10/764* (2022.01); *G06V 10/82* (2022.01); *G06V 2201/07* (2022.01)

(58) Field of Classification Search
  CPC .. G06V 10/82; G06V 2201/07; G06V 10/776; G06V 20/60; G06V 40/10
  See application file for complete search history.

(56) References Cited

U.S. PATENT DOCUMENTS

| | | | | |
|---|---|---|---|---|
| 2018/0158189 | A1* | 6/2018 | Yedla | G06V 10/764 |
| 2018/0211403 | A1* | 7/2018 | Hotson | G06V 10/764 |
| 2018/0268292 | A1* | 9/2018 | Choi | G06V 10/454 |
| 2019/0042943 | A1* | 2/2019 | Dasgupta | G06N 3/084 |
| 2019/0258878 | A1* | 8/2019 | Koivisto | G06V 10/774 |
| 2020/0401855 | A1* | 12/2020 | Kim | G06F 18/254 |
| 2021/0365781 | A1 | 11/2021 | Zhang et al. | |

FOREIGN PATENT DOCUMENTS

| | | | | |
|---|---|---|---|---|
| CN | 112395974 A | * | 2/2021 | ............ G06N 3/045 |
| CN | 113205504 A | | 8/2021 | |
| CN | 113723438 A | | 11/2021 | |
| CN | 114612810 A | | 6/2022 | |
| JP | 2019016268 A | | 1/2019 | |
| TW | 202125326 A | | 7/2021 | |
| WO | WO-2021061951 A1 | * | 4/2021 | ......... G06F 18/2148 |

OTHER PUBLICATIONS

BayesOD: A Bayesian Approach for Uncertainty Estimation in Deep Object Detectors, Ali Harakeh et al., IEEE, 2020, pp. 87-93 (Year: 2020).*

Object detection with class aware region proposal network and focused attention objective, Xiaoyu Tao et al., Elsevier, 2018, pp. 353-361 (Year: 2018).*

Improving neural network's performance using Bayesian inference, Jorge Morales et al., Elsevier, 2021, pp. 319-326 (Year: 2021).*

* cited by examiner

OBJECT DETECTION SYSTEM AND OBJECT DETECTION ASSISTANT SYSTEM

CROSS-REFERENCE TO RELATED APPLICATION

This application claims the priority benefit of Taiwan application serial no. 111125826, filed on Jul. 8, 2022. The entirety of the above-mentioned patent application is hereby incorporated by reference herein and made a part of this specification.

TECHNICAL FIELD

The present invention relates to an object detection technology, and in particular to an object detection system and an object detection assistant system related to confidence correction.

BACKGROUND

The accuracy of confidence in an object detection result can be generally improved by adjusting an object detection model. For example, the accuracy of the confidence can be improved in manner of adding or adjusting a dataset for training of the object detection model, adjusting hyperparameters for the training of the object detection model training, adjusting the backbone of the object detection model, and the like.

However, the adjustment of the object detection model usually takes more time. Furthermore, after the adjustment of the object detection model, it can be judged whether the accuracy of the confidence has indeed improved. That is, before the adjustment of the object detection model, it cannot be ensured that the accuracy of the confidence can be really improved after the adjustment of the object detection model. Therefore, the confidence with a certain degree of accuracy may decline after the adjustment of the object detection model.

SUMMARY

In view of the foregoing, the present invention provides an object detection assistant system and an object detection system. The object detection assistant system includes a memory and a processor. The processor is coupled to the memory. The memory stores one or more commands. The processor accesses and executes one or more commands of the memory. One or more commands include inputting a detection result parameter output by an object detection neural network for object detection of an image to an assistant neural network to output a first correction coefficient after processing by the assistant neural network, where the detection result parameter includes object information and a first confidence; inputting the first correction coefficient and detection result parameters to a Bayesian classifier to output a second correction coefficient; and adjusting the first confidence according to the second correction coefficient to obtain final confidence, the second confidence being taken as the first confidence of the adjusted detection result parameter.

The object detection system includes a memory and a processor. The processor is coupled to the memory. The memory stores one or more commands. The processor accesses and executes one or more commands of the memory. One or more commands include performing the object detection on an image by an object detection neural network to output a detection result parameter to an assistant neural network, where the detection result parameter includes object information and first confidence; processing the detection result parameter by the assistant neural network to output a first correction coefficient; inputting the first correction coefficient and detection result parameter to a Bayesian classifier to output a second correction coefficient; and adjusting the first confidence according to the second correction coefficient to obtain second confidence, the second confidence being taken as the first confidence of the adjusted detection result parameter.

To sum up, according to embodiments of the present invention, the first confidence of the detection result parameter output by the object detection neural network can be adjusted without adjusting the object detection neural network to improve the accuracy of the adjusted first confidence (i.e., the second confidence). In addition, time required can also be saved, and it is ensured that the accuracy of the second confidence can be maintained or improved.

DETAILED DESCRIPTION

Figure 1:
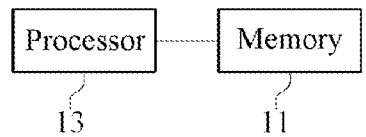
FIG. 1 is a schematic diagram of an object detection assistant system and an object detection system according to some embodiments of the present invention.

Refer to FIG. 1, which is a schematic diagram of an object detection assistant system and an object detection system according to some embodiments of the present invention. The object detection assistant system and the object detection system each include a memory 11 and a processor 13. The processor 13 is coupled to the memory 11. The memory 11 stores one or more commands. The processor 13 accesses and executes one or more commands of the memory 11, to perform the confidence adjustment method of object detection of the present invention.

In some embodiments, the memory 11 is, for example, but not limited to a conventional hard disk, a solid-state hard disk, a flash memory, an optical disk, etc. The processor 13 includes, but not limited to operational circuits such as a central processor, a microprocessor, an application-specific integrated circuit (ASIC), or a system on a chip (SOC).

Figure 2:
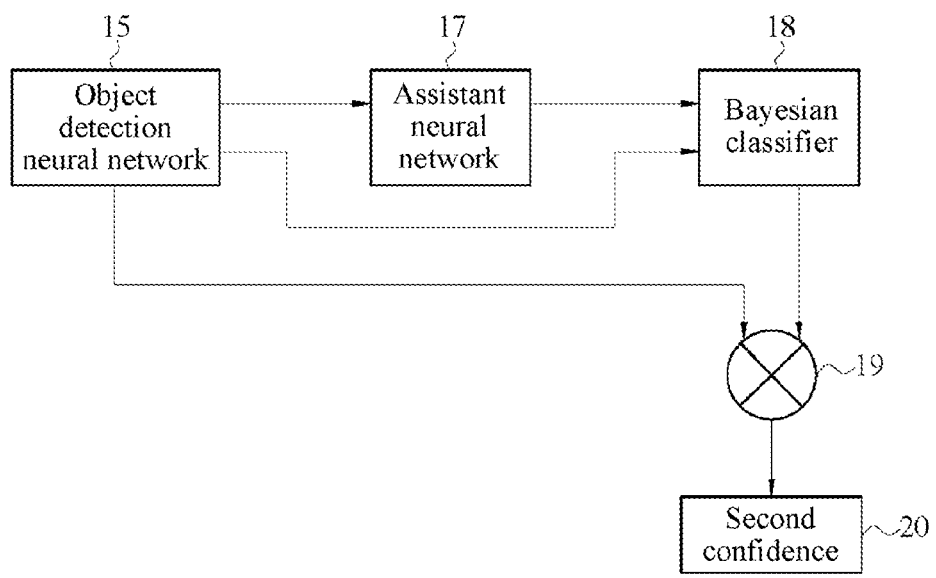
FIG. 2 is a schematic diagram of a module of a processor according to some embodiments of the present invention.

Refer to FIG. 2, which is a schematic diagram of a module of a processor 13 according to some embodiments of the present invention. The processor 13 can implement and execute a variety of different functional modules by using some algorithm operations, and one or more commands of the memory 11 operate with the functional modules to implement the confidence adjustment method of object detection of the present invention. As shown in FIG. 2, in one example, functional modules such as an assistant neural network 17, a Bayesian classifier 18 and a multiplier 19 may be implemented by the processor 13 of the object detection assistant system, and the object detection neural network 15 may be implemented by an additional computing apparatus to output output data (i.e., detection result parameters described below) of the object detection neural network 15 to the processor 13 of the object detection assistant system. In another example, functional modules such as the object detection neural network 15, the assistant neural network 17, the Bayesian classifier 18 and multiplier 19 may be implemented by the processor 13 of the object detection system.

In some embodiments, the object detection neural network 15 is, for example, but not limited to a convolutional neural network (CNN). The assistant neural network 17 is, for example, but not limited to a fully-connected neural network (FNN). The Bayesian classifier 18 includes but not limited to a Gaussian naive Bayes classifier, a multinomial naive Bayes classifier, and a Bernoulli naive Bayes classifier.

Figure 3:
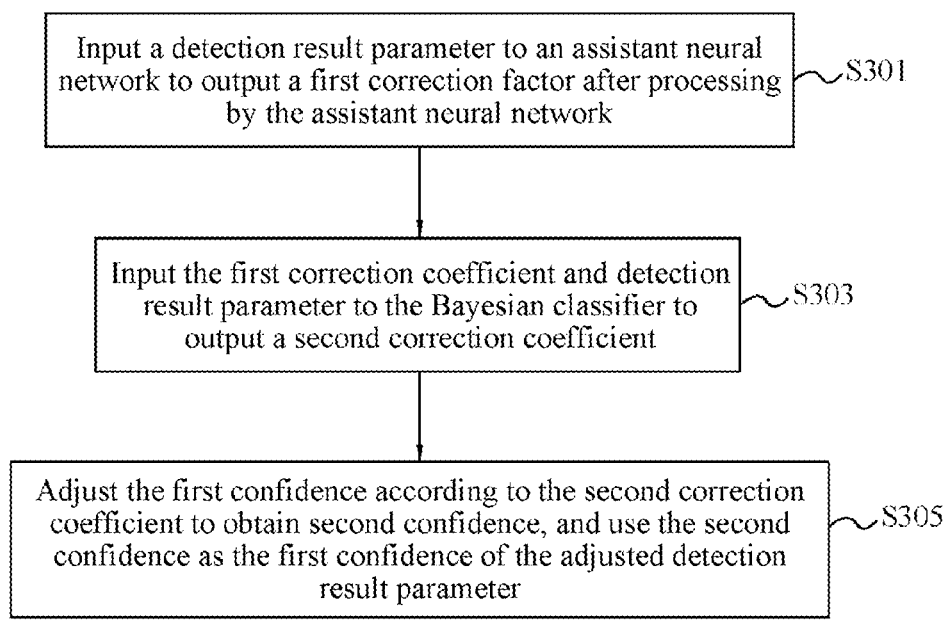
FIG. 3 is a flowchart of a confidence adjustment method of object detection of a first embodiment of the present invention.

Refer to FIG. 3, which is a flowchart of a confidence adjustment method of object detection of a first embodiment of the present invention. One or more commands executed by the processor 13 of the object detection assistant system include steps 301 to 305 to implement the confidence adjustment method of object detection. First, the processor 13 of the object detection assistant system inputs a detection result parameter output by the object detection neural network 15 for object detection of an image to the assistant neural network 17. The assistant neural network 17 processes the detection result parameter and then outputs a first correction coefficient (step S301). Where the detection result parameter includes object information and first confidence of an object that is detected from the image. For instance, the object detection neural network 15 can be trained according to a first training data set to determine object information judgment logic and first confidence judgment logic. The object detection neural network 15 judges the object information of the object that is detected from the image based on the object information judgment logic, and judges the first confidence of the object that is detected from the image based on the first confidence. The assistant neural network 17 can be trained according to a second training data set to determine first correction judgment logic. The assistant neural network 17 generates the first correction coefficient based on the first correction judgment logic for perform a first-time adjustment on the first confidence, thereby initially improving the accuracy of the first-time adjusted first confidence.

In some embodiments, the object information includes an object border and an object type. The object type, for example, but is not limited to, vehicles, animals, pedestrians, and so on. The object border indicates the position and area, in the image, of the object that is detected from the image. The first confidence can be the probability that the object detection neural network 15 predicts whether the object that is detected from the image is a type indicated by the object type. In some embodiments, the object border includes an object coordinate, an object width and an object height. In some embodiments, the object coordinate is the coordinate, in the image, of the center point of the object that is detected from the image, but the present invention is not limited to this. Other positions of the object may be taken as the object coordinate, for example, the coordinate of the upper left corner of the object is taken as the object coordinate. The object height is the horizontal width of the object that is detected from the image. The object height is the vertical height of the object that is detected from the image. In some embodiments, the object width and the object height, in addition to being presented as actual values, can be converted into a percentage occupying the width of the image and a percentage occupying the height of the image respectively through processing by the processor 13 of the object detection assistant system.

Next, the processor 13 of the object detection assistant system inputs the first correction coefficient and the detection result parameter to the Bayesian classifier 18 to output a second correction coefficient (step S303). After that, the processor 13 of the object detection assistant system adjusts the first confidence according to the second correction coefficient to obtain second confidence 20, and the second confidence 20 is taken as the first confidence of the adjusted detection result parameter (step S305). That is, the processor 13 takes the second confidence 20 as new first confidence in the detection result parameter. Thus, when the object that is detected from the image is indeed the type indicated by the object type (that is, correct prediction), the first confidence is increased, and when the object that is detected from the image is not the type indicated by the object type (that is, false positive prediction), the first confidence is decreased to obtain the second confidence 20. That is, a second-time adjustment can also be performed on the first confidence through the second correction coefficient, thereby further improving the accuracy of the second-time adjusted first confidence (that is, the second confidence 20).

In some embodiments, an image region is divided into a plurality of blocks, and the Bayesian classifier 18 has a probability value P (A|B) after being trained. Specifically, the Bayesian classifier 18 can be implemented based on the Bayes's theorem. The Bayes's theorem can be as shown in Equation 1. The probability value P (A|B) (hereinafter referred to as first posterior probability) is the conditional probability that the object meets the object type, the first confidence and the first correction coefficient in a case that the object is detected from a block where the object border is located. P (B|A) is the conditional probability (hereinafter referred to as second posterior probability) that an object is detected from a block where the object border is located, in a case that the object meets the object type, the first confidence and the first correction coefficient. P (A) is the probability (hereinafter referred to as the first posterior probability) that the object meets the object type, the first confidence and the first correction coefficient in any case. P (B) is the probability (hereinafter referred to as the second posterior probability) that an object is detected from a block where the object border is located under in any case. For instance, since different objects have different distribution probabilities (probability of being detected) in different blocks of the image, the Bayesian classifier 18 can be trained according to the third training data set to determine first prior probability judgment logic, second prior probability judgment logic and the second posterior probability judgment logic. The Bayesian classifier 18 calculates first prior probability according to the first prior probability judgment logic, and the object type, the first confidence and the first correction coefficient that are input to the Bayesian classifier 18. The Bayesian classifier 18 calculates second prior probability according to the second prior probability judgment logic and the object border that is input to Bayesian classifier 18. The Bayesian classifier 18 calculates the second posterior probability according to the second posterior probability judgment logic, and the object border, the object type, the first confidence and the first correction coefficient that are input to the Bayesian classifier 18. The Bayesian classifier 18 can calculate the first posterior probability according to Equation 1 and the calculated first prior probability, second prior probability and second posterior probability.

$$P(A|B) = \frac{P(B|A) \times P(A)}{P(B)} \quad \text{(Equation 1)}$$

In some embodiments of step S303, the Bayesian classifier 18 generates the second correction coefficient according to the probability value (i.e., the first posterior probability). For example, the Bayesian classifier 18 generates the second correction coefficient after normalizing the probability value (i.e., the first posterior probability).

In some embodiments of step S305, the processor 13 (specifically, the processor 13, by the multiplier 19) makes the second correction coefficient multiplied by the first confidence to obtain the second confidence 20. That is, the second confidence 20 is the product of the first confidence and the second correction coefficient.

In some embodiments, when the second correction coefficient meets a threshold range, the Bayesian classifier 18 updates the probability value (i.e., the first posterior probability) by using the current object information, the current first confidence and the current first correction coefficient as training data of a third training data set. For instance, when the threshold range is 0.8 to 0.9, the second correction coefficient has a small adjustment range to the first confidence, that is, the current object information, the current first confidence and the current first correction coefficient have better accuracy. Therefore, the accuracy of the second confidence 20 obtained after the first confidence is adjusted with the second correction coefficient can be further improved by taking the current object information, the current first confidence and the current first correction coefficient as a training data of the third training data set.

Figure 4:
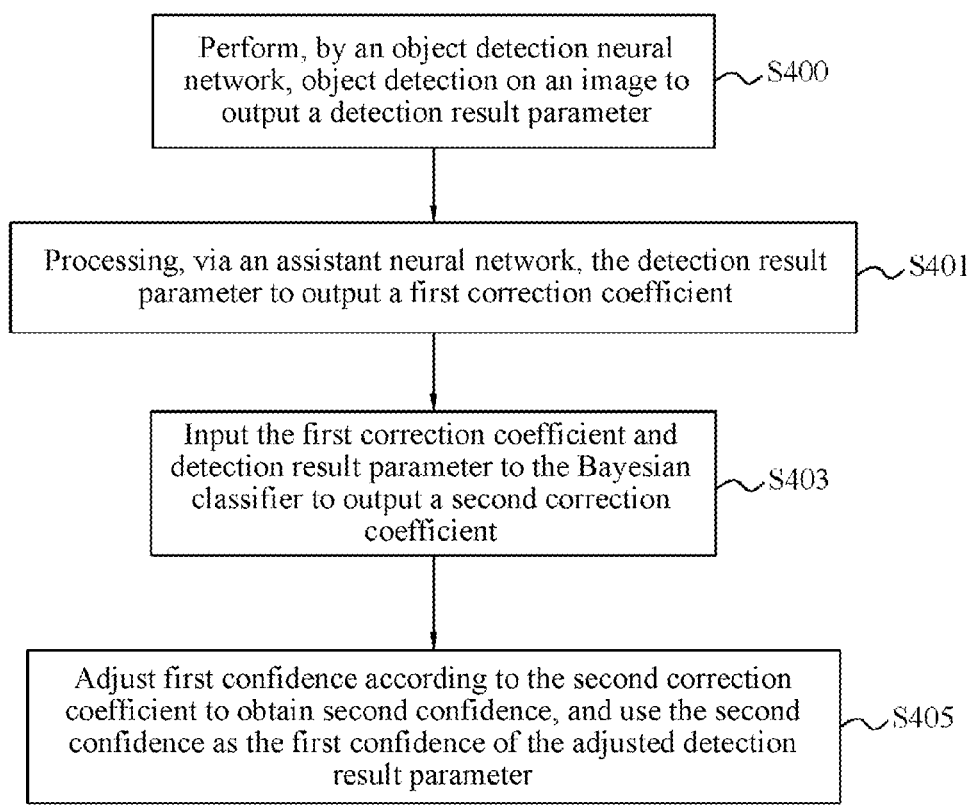
FIG. 4 is a flowchart of a confidence adjustment method of object detection of second first embodiment of the present invention.

Refer to FIG. 4, which is a flowchart of a confidence adjustment method of object detection of second first embodiment of the present invention. One or more commands executed by the processor 13 of the object detection system include steps 400 to 405 to implement the confidence adjustment method of object detection. Step S403 and step S405 are the same as step S303 and step S305, which will not be repeated here. The second embodiment is different from the first embodiment that the processor 13 of the object detection system first performs object detection on the image via the object detection neural network 15 to output the detection result parameter to the assistant neural network 17 (step S400). Next, the processor 13 of the object detection system processes the detection result parameter via the assistant neural network 17 to output the first correction coefficient (step S401). That is, compared with the first embodiment, the second embodiment not only generates the detection result parameters through the object detection neural network 15, but also inputs the detection result parameter to the assistant neural network 17 to generate the first correction coefficient.

To sum up, according to embodiments of the present invention, the first confidence of the detection result parameter output by the object detection neural network can be adjusted without adjusting the object detection neural network to improve the accuracy of the adjusted first confidence (i.e., the second confidence). In addition, time required can also be saved, and it is ensured that the accuracy of the second confidence can be maintained or improved.

What is claimed is:

1. An object detection assistant system, comprising:
   a memory, storing commands; and
   a processor, coupling to the memory, and accessing and executing the commands of the memory, the commands comprising:
   inputting a detection result parameter output by an object detection neural network for object detection of an image to an assistant neural network to output a first correction coefficient after processing by the assistant neural network, the detection result parameter comprising object information and a first confidence;
   inputting the first correction coefficient and the detection result parameter to a Bayesian classifier to output a second correction coefficient; and
   obtaining second confidence according to the first confidence and the second correction coefficient and updating the first confidence of the detection result parameter to the second confidence.

2. The object detection assistant system according to claim 1, wherein the object information comprises an object border and an object type, the image region is divided into a plurality of blocks, the Bayesian classifier is trained to have a probability value, the probability value being the conditional probability that an object meets the object type, the first confidence and the first correction coefficient in a case that the object is detected in the block where the object border is located, and the second correction coefficient is generated according to the probability value.

3. The object detection assistant system according to claim 2, wherein the object border comprises an object coordinate, an object width and an object height.

4. The object detection assistant system according to claim 2, wherein the probability value is updated by taking the current object information, the first confidence and the first correction coefficient as training data, in a case that the second correction coefficient meets a threshold range.

5. The object detection assistant system according to claim 1, wherein the second confidence is the product of the first confidence and the second correction coefficient.

6. An object detection system, comprising:
   a memory, storing commands; and
   a processor, coupling to the memory, and accessing and executing the commands of the memory, the commands comprising:
   performing, via an object detection neural network, object detection on an image to output a detection result parameter to an assistant neural network, the detection result parameter comprising object information and first confidence;
   processing, via the assistant neural network, the detection result parameter to output a first correction coefficient;
   inputting the first correction coefficient and the detection result parameter to a Bayesian classifier to output a second correction coefficient; and
   obtaining second confidence according to the first confidence and the second correction coefficient and updating the first confidence of the detection result parameter to the second confidence.

7. The object detection system according to claim 6, wherein the object information comprises an object border and an object type, the image region is divided into a plurality of blocks, the Bayesian classifier is trained to have a probability value, the probability value being the conditional probability that an object meets the object type, the first confidence and the first correction coefficient in a case that the object is detected in the block where the object border is located, and the second correction coefficient is generated according to the probability value.

8. The object detection system according to claim 7, wherein the object border comprises an object coordinate, an object width and an object height.

9. The object detection system according to claim 7, wherein the probability value is updated by taking the current object information, the first confidence and the first correction coefficient as training data, in a case that the second correction coefficient meets a threshold range.

10. The object detection system according to claim 6, wherein the second confidence is the product of the first confidence and the second correction coefficient.

\* \* \* \* \*